(12) United States Patent
Stauffer

(10) Patent No.: US 6,767,528 B2
(45) Date of Patent: Jul. 27, 2004

(54) MANUFACTURE OF HYDROGEN CHLORIDE FROM SALT AND SULFURIC ACID

(76) Inventor: John E. Stauffer, 6 Pecksland Rd., Greenwich, CT (US) 06831

(*) Notice: Subject to any disclaimer, the term of this patent is extended or adjusted under 35 U.S.C. 154(b) by 294 days.

(21) Appl. No.: 09/784,616

(22) Filed: Feb. 15, 2001

(65) Prior Publication Data
US 2001/0026787 A1 Oct. 4, 2001

Related U.S. Application Data

(63) Continuation-in-part of application No. 09/413,226, filed on Oct. 13, 1998, now abandoned, which is a continuation of application No. 08/886,383, filed on Jul. 1, 1997, now abandoned.

(51) Int. Cl.[7] ................................................. C01B 7/01
(52) U.S. Cl. ....................................... 423/482; 423/552
(58) Field of Search ............................... 423/482, 552, 423/532, 522

(56) References Cited

U.S. PATENT DOCUMENTS

| | | | | |
|---|---|---|---|---|
| 1,102,539 A | * | 7/1914 | Nield | 423/482 |
| 2,081,118 A | * | 5/1937 | Kast | 423/482 |
| 2,475,752 A | * | 7/1949 | Nachod et al. | 423/482 |
| 4,191,736 A | * | 3/1980 | Chay | 423/482 |
| 4,268,492 A | * | 5/1981 | Sardisco et al. | 423/482 |
| 4,342,737 A | * | 8/1982 | Iwashita et al. | 423/552 |
| 4,420,468 A | * | 12/1983 | Yamashita et al. | 423/482 |

OTHER PUBLICATIONS

Babor, "Basic College Chemistry", 2nd edition, pp. 255–261, 1953 (no month).*
Felder et al, "Elementary Principles of Chemical Processes", pp. 106, 1978 (no month).*
Chemical Engineers' Handbook, Third edition, TP 155 P4, pp. 1608–1612, 1950 (no month).*
Perry et al, Chemical Engineers' Handbook, Fifth edition, pp. 20–30 to 20–41, 1973 (no month).*

* cited by examiner

Primary Examiner—Ngoc-Yen Nguyen

(57) ABSTRACT

The specification discloses a continuous process for producing hydrogen chloride whereby sulfuric acid and an alkali metal chloride are fed to a direct fired reaction chamber in a molar ratio of approximately one to one, products comprising hydrogen chloride and the corresponding alkali metal sulfate are withdrawn, and the hydrogen chloride is separated from combustion gases. The reaction chamber provides for the counter flow of gaseous and solid streams within the reaction chamber, such that a chloride-free sulfate is obtained.

3 Claims, 2 Drawing Sheets

ROTARY KILN FOR THE MANUFACTURE OF HCL FROM SALT AND SULFURIC ACID

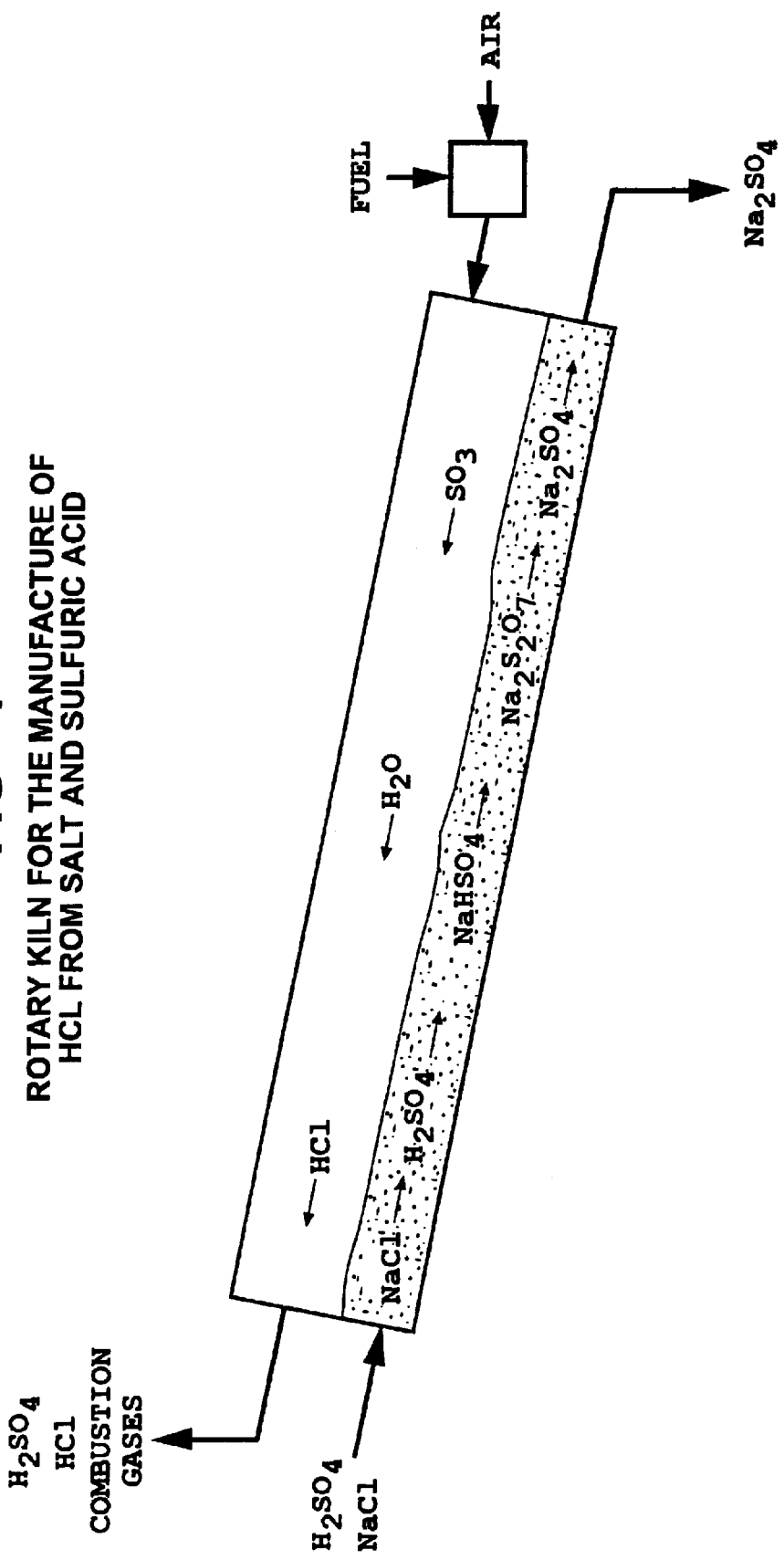

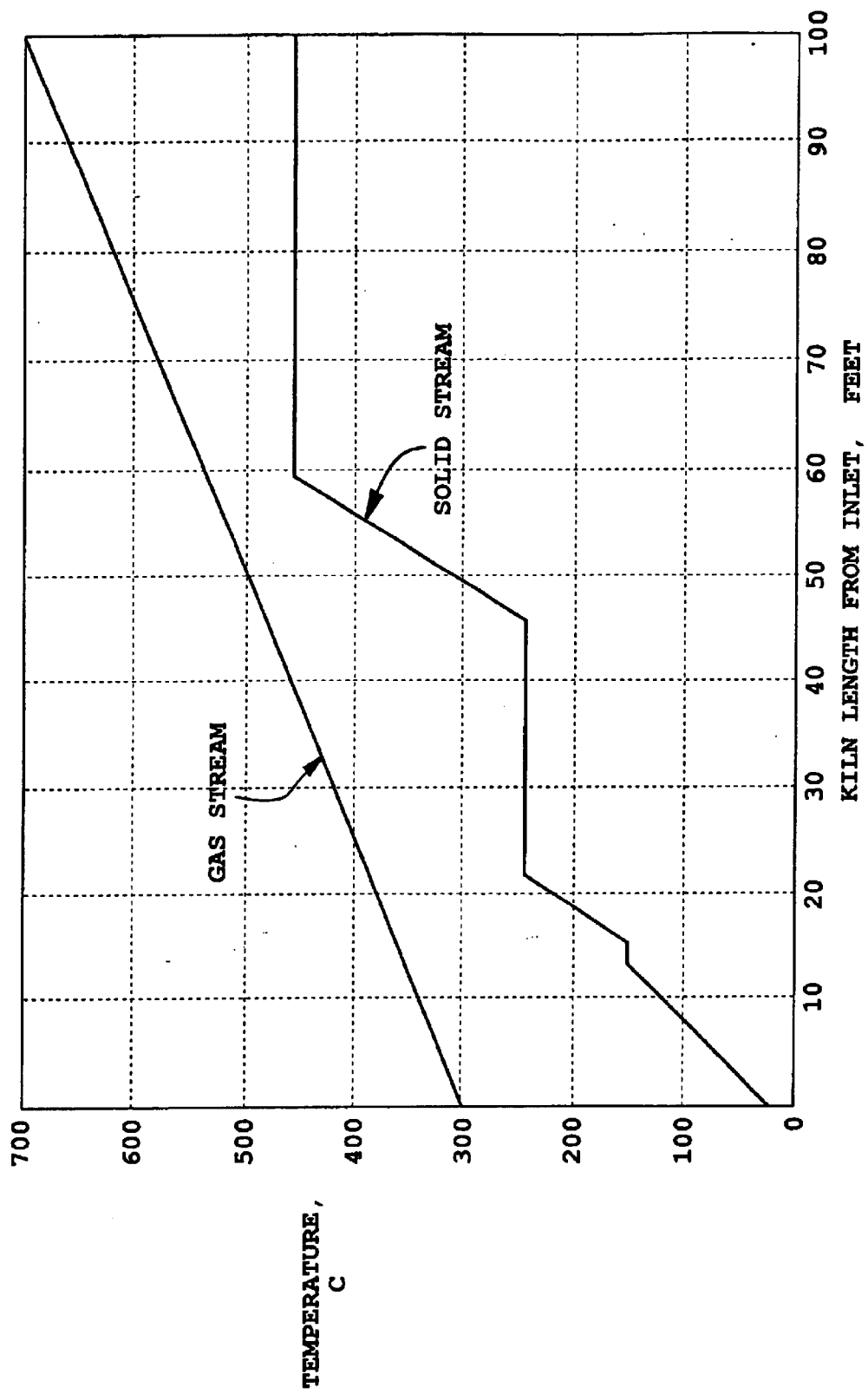
FIG-2 TEMPERATURE PROFILE OF KILN FOR MANUFACTURE OF HCL FROM SALT AND SULFURIC ACID

MANUFACTURE OF HYDROGEN CHLORIDE FROM SALT AND SULFURIC ACID

CROSS-REFERENCE TO RELATED APPLICATION

This application is a continuation-in-part of U.S. patent application Ser. No. 09/413,226, filed Oct. 13, 1998, now abandoned, which is a continuation of U.S. patent application Ser. No. 08/886,383, filed Jul. 1, 1997, now abandoned.

FIELD OF THE INVENTION

This invention relates to an improved process for the manufacture of hydrogen chloride (HCl) and an alkali metal sulfate from sulfuric acid and the corresponding alkali metal chloride. The process is applicable to various alkali metal chlorides including sodium, potassium and lithium chloride. The process comprises the continuous reaction between sulfuric acid and salt in a reaction chamber which provides for the counter current flow of gases and solids. These conditions are perfectly met in a direct fired rotary kiln.

BACKGROUND OF THE INVENTION

Hydrogen chloride has been produced for many years from salt and sulfuric acid. Three centuries ago Johann Glauber discovered that when sulfuric acid is poured over common salt a colorless acrid gas is evolved. Later identified as hydrogen chloride, this gas is readily dissolved in water to form hydrochloric or muriatic acid.

The reaction first observed by Glauber was later employed by the French chemist Nicholas LeBlanc, who developed an industrial process for soda ash in 1794. In the front end of the LeBlanc process, sulfuric acid is reacted with salt to produce sodium sulfate which is subsequently converted with carbon and limestone to give sodium carbonate. Even though the LeBlanc Process was displaced by the Solvay process some seventy years later, hydrogen chloride continued to be produced by this chemistry.

The technology for producing hydrogen chloride changed very little over the years. An excellent summary of this technology was presented in a monograph published by the American Chemical Society in 1927. This publication titled, "Hydrochloric Acid and Sodium Sulfate" by N. A. Laury provided details of the furnaces used to convert an intermediate in the process, namely, sodium hydrogen sulfate to sodium sulfate. Although of varied designs, these furnaces were without exception inefficient to operate. They produced a solid product that contained significant chloride impurities. Perhaps the best known furnace in this group was the Mannheim furnace, which was a muffle furnace with a cast iron pan and scrapers.

The first noteworthy departure in furnace design appeared with the proposed use of a fluidized bed reactor in 1955. Described in U.S. Pat. No. 2,706,145, the Cannon process for the "Production of Sulfates and HCl" claimed to have overcome the drawbacks of the old technology. The fluidized bed process, however, had problems of its own. High conversions could not be obtained. And the well documented difficulties of fluidized beds plagued the process. Although the Cannon process received considerable attention, it has never been commercialized.

In later years there has been a lack of interest in the manufacture of hydrogen chloride from salt and sulfuric acid. The huge quantities of by-product hydrogen chloride produced in organic chlorinations shifted concern from HCl production to HCl disposal. More than enough by-product hydrogen chloride was being produced to satisfy the demand for this commodity chemical.

The present status of hydrogen chloride production would most likely continue unchanged except for the development of a relatively new organic reaction called oxychlorination. This process allows hydrogen chloride to be substituted for chlorine in certain organic chlorination processes. The most notable example is the production of ethylene dichloride from ethylene, hydrogen chloride, and oxygen.

Shifting technology again draws one's attention to the manufacture of hydrogen chloride from salt and sulfuric acid. To succeed, however, any new process must meet the need for low capital investment, achieve high energy efficiency, and produce high purity products. It must also be easy to operate and require minimum maintenance.

It is therefore an object of the present invention to overcome the problems with the prior art.

Further, it is desired to provide for a process that can be extremely cost competitive.

Finally, it is an object of this invention to meet all environmental and safety concerns.

These and other objects, features and advantages of the invention will be apparent from the following description and the accompanying drawings.

SUMMARY OF THE INVENTION

The invention in one preferred embodiment concerns a process for the production of hydrogen chloride and alkali metal sulfate from sulfuric acid and the corresponding alkali metal chloride. The most common alkali metal chlorides used as feed materials are sodium, potassium, and lithium chloride.

The process comprises one reaction step which is operated on a continuous basis. The design of the reaction chamber provides for the counter current flow of gaseous and solid materials within this chamber. Back mixing of solids in the reactor is minimized so that a chloride-free sulfate can be obtained. Heat is applied to the reaction chamber to promote the chemical reactions which occur. The reactor is direct fired; the products of combustion from a burner become intimately mixed with the gaseous products within the reaction chamber.

In greater detail, reactants sulfuric acid and an alkali metal chloride in a molar ratio of approximately one to one are fed to the reaction chamber through a port at one extremity, and sodium sulfate product is withdrawn at an opposite location. When a rotary kiln is used as the reactor, the feed is introduced at the higher end of the kiln and sodium sulfate is withdrawn at the lower end. Gaseous products comprising hydrogen chloride and unreacted sulfuric acid are withdrawn from the chamber at a point near the inlet. The burner is located near the exit port for the sodium sulfate. Solids travel through the reaction chamber by means of gravity, a conveyor mechanism or some combination of both. The flow of gases depends on pressure differences.

The solid sodium sulfate is cooled after leaving the reactor and further processed as needed. The gaseous products are typically scrubbed to remove hydrogen chloride. Purified hydrogen chloride is recovered from the scrubbing solution. Unreacted sulfuric acid is recycled back to the reaction chamber.

BRIEF DESCRIPTION OF THE DRAWINGS

FIG. 1 is a schematic drawing of a rotary kiln used as a reaction chamber in one embodiment of the process. The flow of materials is indicated, including the feed of raw materials and the withdrawal of products.

FIG. 2 is a representation of the thermal gradients in the rotary kiln. The graph indicates temperatures of both gaseous and solid streams as they pass through the kiln.

DETAILED DESCRIPTION OF THE PROCESS

The prior art has failed to produce an efficient process for the manufacture of hydrogen chloride from salt and sulfuric acid because of a serious blunder in the analysis of the chemistry. All along, the prior art has represented the chemistry as consisting of two chemical reactions. These reactions are illustrated by the following equations:

$$NaCl + H_2SO_4 \rightarrow HCl + NaHSO_4 \qquad 1.$$

$$NaCl + NaHSO_4 \rightarrow HCl + Na_2SO_4 \qquad 2.$$

Thus, faulty assumptions led to processes designed with two reaction steps operated batchwise.

The reaction of salt with sulfuric acid as shown by equation 1 is slightly endothermic and proceeds rapidly to form hydrogen chloride and sodium hydrogen sulfate. The latter product has several names, including sodium bisulfate and niter cake. The process could conceivably be terminated at this point, but the efficiency based on the consumption of sulfuric acid would be 50 percent at best. Also there is limited demand for sodium hydrogen sulfate.

The second reaction shown is between salt and sodium hydrogen sulfate to produce hydrogen chloride and sodium sulfate. The latter product is also known as salt cake. This reaction is difficult to carry out. Being endothermic, this reaction requires substantial heat to promote it, and it is normally run at temperatures in the range of 550° to 600° C. The principal drawback of this reaction, however, is that it takes place between two solids. Mass transfer is extremely slow under such conditions even when thorough mixing and vigorous agitation are used. Inevitably solid particles become coated with product, thus preventing the completion of the reaction.

In order to design an improved process, a better understanding of the chemistry is required. A knowledge of the reaction mechanism is absolutely necessary. What actually takes place in the reaction of sulfuric acid with salt can be summarized by the following equations:

$$2H_2SO_4 + 2NaCl \rightarrow 2NaHSO_4 + 2HCl \quad \Delta H = 1.76 \ k\text{-}cal. \qquad 3.$$

$$2NaHSO_4 \rightarrow Na_2S_2O_7 + H_2O \quad \Delta H = 20.4 \ k\text{-}cal. \qquad 4.$$

$$Na_2S_2O_7 \rightarrow Na_2SO_4 + SO_3 \quad \Delta H = 34.85 \ k\text{-}cal. \qquad 5.$$

$$H_2O + SO_3 \rightarrow H_2SO_4 \quad \Delta H = -41.66 \ k\text{-}cal. \qquad 6.$$

$$2H_2SO_4 + 2NaCl \rightarrow 2 \ HCl + Na_2SO_4 + H_2SO_4 \qquad 7.$$

Equation 3 is essentially the same as equation 1. This reaction proceeds smoothly at a temperature of about 150° C. Being a reaction between a solid and a liquid, good contact can be achieved between the reactants. In the second reaction shown by equation 4, sodium hydrogen sulfate decomposes to produce sodium pyrosulfate and water. This reaction is also endothermic and takes place at about 240° to 250° C. As indicated by equation 5, sodium pyrosulfate decomposes to give sodium sulfate and sulfur trioxide. This reaction, which is endothermic, proceeds at close to 460° C. Finally, the reaction between water and sulfur trioxide to form sulfuric acid is shown by equation 6. This reaction has been studied extensively.

By combining equations 3 through 6, the reaction shown in equation 7 is To obtained. This latter equation illustrates the overall process whereby sulfuric acid is reacted with salt to give hydrogen chloride, sodium sulfate and fresh sulfuric acid.

Focusing attention on equation 3 through 6, it is apparent that water from equation 4 will combine with sulfur trioxide from equation 5 to give sulfuric acid as shown in equation 6. The resulting sulfuric acid must be recycled back to equation 3. These requirements can be achieved in a practical process by providing for the counter current flow of gases and solids in a reaction chamber. Sulfuric acid which exits the reaction chamber with the gaseous products is condensed and returned to the feed.

To illustrate the process of the present invention, FIG. 1 shows a rotary kiln used as the reaction chamber. The reactants sulfuric acid and salt in a molar ratio of about one to one are fed to the kiln at the far left, that is, at the upper end of the kiln. As the kiln rotates, the solids slowly move down the kiln toward the right. A burner is located at the right or lower end of the kiln. Hot combustion gases pass upward through the kiln to the gas exit port located at the left end.

As the gaseous and solid streams flow counter current to each other, they undergo the reactions shown in equations 3 and 6. Beginning at the far right, the combustion gases are sufficiently hot to decompose sodium pyrosulfate to produce sodium sulfate and sulfur trioxide. The sodium sulfate is discharged from the kiln through a port at the far right end, and the sulfur trioxide enters the gas stream which is moving to the left. Somewhere towards the middle of the kiln, sodium hydrogen sulfate is decomposed to give sodium pyrosulfate and water vapor. The solid pyrosulfate moves toward the right while the water vapor flows with the combustion gases upwards towards the left. In the left hand section of the kiln, water vapor and sulfur trioxide combine to form sulfuric acid. This acid for the most part is lost with the product gases since the temperature of the flue gases at the exit exceeds the boiling points of lower concentrations of sulfuric acid. Acid in the feed combines with the salt to form hydrogen chloride and sodium hydrogen sulfate. The solid sodium hydrogen sulfate moves to the right while the hydrogen chloride escapes with the combustion gases through the vent in the left end of the kiln.

In order to achieve effective counter current contact between solids and gases, the rotary kiln must be properly designed. Perry's *Chemical Engineers' Handbook*, 3$^{rd}$ ed., McGraw-Hill Book Co., 1950, indicates that the dimensions of the kiln should be such that the ratio of the length of the kiln to the shell diameter is usually between 10 and 40. Thus, a kiln with an outside diameter of 6 feet must have a minimum length of 60 feet. In a correctly designed kiln, the backward mixing of product with feed will be prevented so that contamination of sodium sulfate with chloride can be avoided.

The details of the kiln design are not shown in FIG. 1, but they should be familiar to those persons knowledgeable in the art. The kiln is lined with suitable brick which is acid-resistant and provides thermal insulation. The kiln is rotated by means of a girth gear. The slope of the kiln from the horizontal may vary from ³⁄₁₆ to ¾ inch per foot of kiln length. Such a slope ensures continuous operation of the process. To prevent the solids from caking or building up on the inner surface, any one of several known techniques may be used, including the use of an internal chain or hammers spaced along the length of the shell.

Other reactor designs are applicable to the present invention. A multi-deck rotating hearth furnace or a furnace employing a continuous conveyor could be used. Determining factors in the choice of reactor would be the cost of the original investment and the reliability of the equipment under severe operating conditions.

The sodium sulfate product from the reaction chamber is cooled, ground and classified as need be. The product may be cooled by air which is introduced to the burner in order to obtain better thermal efficiencies.

The hydrogen chloride in the exit combustion gases is recovered by known methods. The concentration of hydrogen chloride is less than would be expected from a muffle furnace. In spite of claims to the contrary, the lower concentration of hydrogen chloride is of little significance. Hydrogen chloride is extremely soluble in aqueous solutions, and therefore it can readily be recovered even from dilute gas streams. For example, hydrogen chloride is first absorbed from the gas in weak hydrochloric acid. Next the product is stripped from concentrated acid in a second column. In order to comply with environmental and safety regulations, a caustic scrubber is used to remove traces of hydrogen chloride from the combustion gases before they are vented to the atmosphere.

A temperature profile of the gaseous and solid streams in the kiln is illustrated in FIG. 2. The temperature of each stream is plotted as a function of the distance traveled in the kiln. Similar profiles would be obtained if the temperatures were plotted versus the heat transferred from the combustion gases to the solid materials.

Several features are striking about these curves. The graph for the gaseous stream approximates a straight line whose slope depends on the gas flow rate. The graph for the solids has three flat segments which represent the chemical transformations or phase changes. As previously noted in the description of the reaction mechanism, these reactions occur at three different temperatures levels, namely, 150° C., 240° to 250° C., and 460° C.

An obvious benefit which is shown by this temperature profile is the energy efficiency which is realized. The hot combustion gases immediately coming from the burner are used to promote the highest temperature reaction. As the gases cool, they next heat the solids undergoing the intermediate reaction. Finally, the coolest gases are used to supply heat to the initial or lowest temperature reaction. A measure of the energy efficiency is the space or separation between the gas curve and the solids curve. These curves are prevented from crossing or touching because of the need for a minimum Δt or temperature difference to effect heat transfer. The investigation of this minimum temperature difference at all locations in the process can be undertaken by a modern technique known as thermal pinch analysis.

The inherent energy efficiency of the process is an advantage in using weak sulfuric acid as a feed. Although concentrated acid, 95% or greater, is preferred as a raw material, the process is capable of handling acids with lower concentrations. This flexibility improves the utility of the process.

The process of the present invention has been described using sodium chloride as the starting material. This reactant produces salt cake, which is a valuable item of commerce. Instead of starting with sodium chloride, potassium chloride could be used in which case potassium sulfate would be the product. The latter compound is an important component of fertilizers. Lithium chloride might also be used in the process although the occurrence of this mineral is much less than the prevalence of the other mentioned chlorides.

There are multiple uses for hydrogen chloride. As noted earlier, its application in organic chlorinations could become significant. The cost of production would be a major determinant in the demand for this material.

What is claimed is:

1. A continuous process for the production of hydrogen chloride whereby sulfuric acid and an alkali metal (M) chloride in a molar ratio of approximately one to one are fed to a direct fired reaction chamber, products comprising hydrogen chloride and the corresponding alkali metal sulfate are withdrawn, and the hydrogen chloride is separated from combustion gases, said reaction chamber being one that provides for the counter flow of gaseous and solid streams within the reaction chamber, such that a chloride-free sulfate is obtained, wherein said process is characterized by the following chemical reactions:

$$2H_2SO_4 + 2MCl \rightarrow 2MHSO_4 + 2HCl$$

$$2MHSO_4 \rightarrow M_2S_2O_7 + H_2O$$

$$M_2S_2O_7 \rightarrow M_2SO_4 + SO_3$$

$$H_2O + SO_3 \rightarrow H_2SO_4.$$

2. The process of claim 1, wherein the alkali metal chloride is sodium chloride and the corresponding alkali metal sulfate is sodium sulfate.

3. The process of claim 1, wherein the alkali metal chloride is potassium chloride and the corresponding alkali metal sulfate is potassium sulfate.

* * * * *